(12) United States Patent
Kashiwagi et al.

(10) Patent No.: US 8,971,610 B2
(45) Date of Patent: Mar. 3, 2015

(54) METHOD AND APPARATUS OF COMPILING IMAGE DATABASE FOR THREE-DIMENSIONAL OBJECT RECOGNITION

(75) Inventors: Takahiro Kashiwagi, Osaka (JP); Takumi Toyama, Osaka (JP); Koichi Kise, Osaka (JP); Yukihito Furuhashi, Tokyo (JP); Taiji Mine, Tokyo (JP)

(73) Assignees: Osaka Prefecture University Public Corporation, Osaka (JP); Olympus Corporation, Tokyo (JP)

( * ) Notice: Subject to any disclaimer, the term of this patent is extended or adjusted under 35 U.S.C. 154(b) by 289 days.

(21) Appl. No.: 13/643,284

(22) PCT Filed: Apr. 27, 2011

(86) PCT No.: PCT/JP2011/060277
§ 371 (c)(1),
(2), (4) Date: Oct. 24, 2012

(87) PCT Pub. No.: WO2011/136276
PCT Pub. Date: Nov. 3, 2011

(65) Prior Publication Data
US 2013/0039569 A1 Feb. 14, 2013

(30) Foreign Application Priority Data
Apr. 28, 2010 (JP) ................................ 2010-103543

(51) Int. Cl.
*G06K 9/46* (2006.01)
*G06K 9/62* (2006.01)

(52) U.S. Cl.
CPC ............ *G06K 9/6247* (2013.01); *G06K 9/4671* (2013.01)
USPC ............ 382/154; 382/190; 382/201; 382/225

(58) Field of Classification Search
None
See application file for complete search history.

(56) References Cited

U.S. PATENT DOCUMENTS

| 2010/0027895 | A1 | 2/2010 | Noguchi et al. | |
| 2010/0158355 | A1* | 6/2010 | Najafi et al. | 382/154 |
| 2011/0058733 | A1 | 3/2011 | Inoue et al. | |

FOREIGN PATENT DOCUMENTS

| JP | 2010-009332 A | 1/2010 |
| WO | 2008/026414 A1 | 3/2008 |
| WO | 2009/133855 A1 | 11/2009 |

OTHER PUBLICATIONS

T.F. Cootes, View-based active appearance models, Image and Vision Computing 20 (2002), pp. 657-664.*

(Continued)

*Primary Examiner* — Brian P Werner
(74) *Attorney, Agent, or Firm* — Renner, Otto, Boisselle & Sklar, LLP

(57) ABSTRACT

A method of compiling an image database for a three-dimensional object recognition including the steps of: when a plurality of images each showing an object from different viewpoint are inputted, extracting local features from each of the images, and expressing the local features using feature vectors; forming sets of the feature vectors, each set representing a same part of the object from a series of the viewpoints, and generating subspaces, each subspace representing a characteristic of each set; and storing each subspace to the image database with an identifier of the object to perform a recognition process that is realized by the steps of: when at least one image of an object is given as a query, extracting query feature vectors; determining the subspace most similar to each query feature vector; and executing a counting process to the identifiers to retrieve an object most similar to the query.

13 Claims, 15 Drawing Sheets

(56) References Cited

OTHER PUBLICATIONS

International Search Report for corresponding International Application No. PCT/JP2011/060277 mailed Jun. 7, 2011.
Extended European Search Report for corresponding European Application No. 11775057.0 dated Oct. 31, 2014.
English Translation of Chinese Office Action issued on Dec. 1, 2014 for corresponding Chinese Application No. 201180021296.X.

Jérome Revaud et al.; "Fast and cheap object recognition by linear combination of views"; CIVR'07, Jan. 7, 2007-Jul. 11, 2007, pp. 194-201, XP055147810, Amsterdam; DOI: 10.1145/1282280. 1282313; ISBN: 978-1-59-593733-9.
D.G. Lowe; "Local feature view clustering for 3D object recognition"; Proceedings of the 2001 IEEE Computer Society Conference on Computer Vision and Pattern Recognition; CVPR 2001, vol. 1, Jan. 1, 2001, pp. 1-682, XP055147678; DOI: 10.1109/CVPR.2001. 990541; ISBN: 978-0-76-951272-3.

* cited by examiner

Fig.1
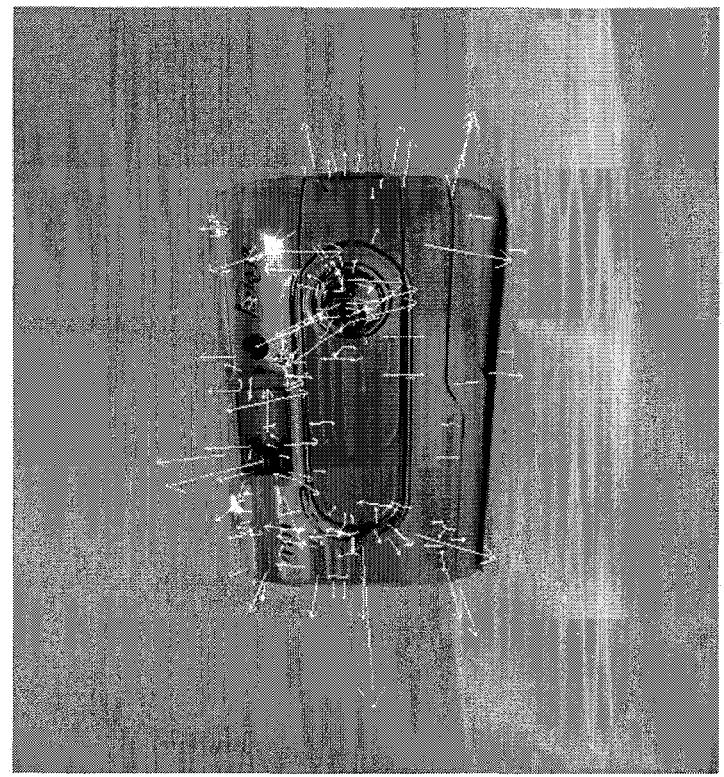
(a)
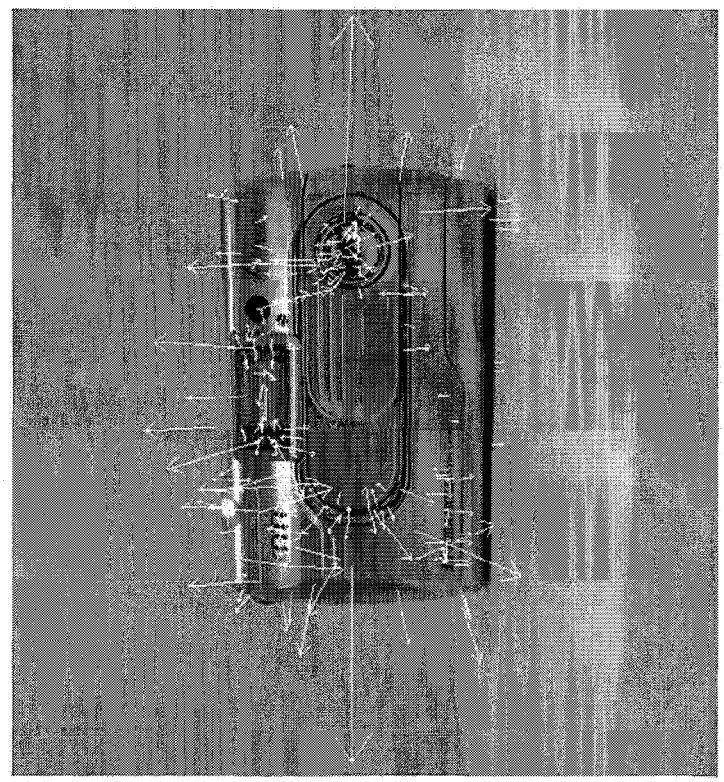
(b)

Fig. 10
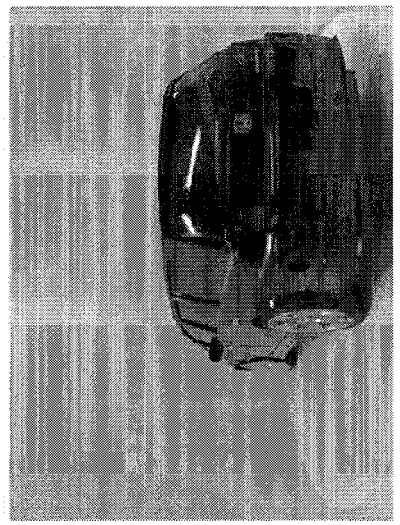
(a)
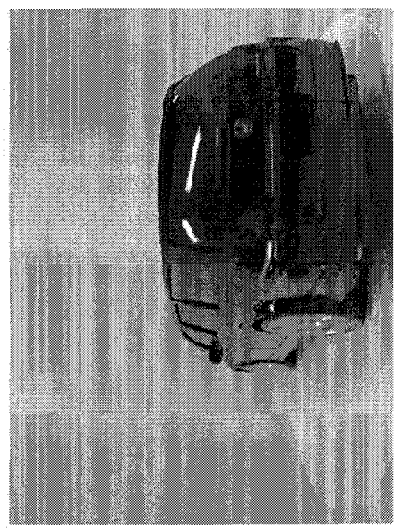
(b)

METHOD AND APPARATUS OF COMPILING IMAGE DATABASE FOR THREE-DIMENSIONAL OBJECT RECOGNITION

TECHNICAL FIELD

The present invention relates to a method and an apparatus of compiling an image database for three-dimensional object recognition.

BACKGROUND ART

In recent years, as digital cameras and camera-equipped cell-phones are increasingly widespread and sophisticated, a user can easily form and utilize image data. With this, researches using image data have actively been made. One of them is a research for identifying three-dimensional objects included in images.

As a method of identifying a three-dimensional object by a computer process, there is a method of identifying a three-dimensional object by using a geometric shape of the object (e.g., see Non-Patent Literatures 1 and 2). There is also a method of identifying a three-dimensional object by utilizing a two-dimensional image formed by capturing the object (e.g., see Non-Patent Literatures 3 and 4). The present invention focuses on the latter, i.e., the method of identifying a three-dimensional object by utilizing a two-dimensional image, of the above-mentioned methods.

This method includes a method of using local features. The local feature describes a feature of a local region in an image with a vector. In general, a few hundred to a few thousand local features are acquired from various regions in one image. Therefore, even when only a part of an object is shown in a query image, or even when a part of an object is occluded, a corresponding three-dimensional object can be identified by using the part shown in the query image according to this method. The method using local features is robust for the case where the shooting condition is different, or for a transformation such as a similar transformation and rotation.

The simplest method of identifying a three-dimensional object by using local features is the method of shooting various objects beforehand, and storing local features extracted from these images in a database. An object is identified by comparing each local feature extracted from the query image and the local features stored in the database. In order to realize a highly-precise recognition of a three-dimensional object, the three-dimensional object has to be identified from a query image that is shot from any angles. Accordingly, it would be better that the object is shot from various angles, and local features are extracted from these images and stored in a database. However, if all of these local features are intended to be stored, a large memory has to be needed, which becomes a problem.

Various methods have been proposed so far for solving this problem. One of them is a method of selecting necessary local features, in order to reduce the number of the local features that are to be stored in a database for realizing a memory reduction (for example, see Non-Patent Literature 5).

CITATION LIST

Non-Patent Document

Non-Patent Document 1: P. J. Besl and R. C. Jain: "Three-Dimensional Object Recognition", ACM Computing Surveys, 17, 1, pp. 75-145 (1985)

Non-Patent Document 2: F. Rothganger, S. Lazebnik, C. Schmid and J. Ponce: "3D Object Modeling and Recognition Using Local Affine-Invariant Image Descriptors and Multi-View Spatial Constraints", International Journal of Computer Vision, 66, 3 (2006)

Non-Patent Document 3: Murase, S. K. Nayar: "3D object Recognition from appearance—parametric eigenspace method—", The Transactions of the Institute of Electronics, Information and Communication Engineers (D-II), vol. J77-D-II, no. 11, pp. 2179-2187 (1994)

Non-Patent Document 4: Inoue, Miyake, Kise, "Experimental Investigation of a Memory Reduction for 3D Object Recognition Based on Selection of Local Features", The IEICE transactions on information and systems D, J92-D, 9, pp. 1686-1689 (2009)

Non-Patent Document 5: Hondo, Kise, "Inspection of Memory Reduction Methods for Specific Object Recognition: Approaches by quantization and selection of Local Features", Technical Report of The Institute of Electronics, Information, and Communication Engineers (2009)

DISCLOSURE OF THE INVENTION

Problem to be Solved by the Invention

However, when local features are randomly selected for saving the memory required for storing the local features, the recognition rate of an object might be reduced. In order to efficiently attain the memory reduction without the reduction in the recognition rate, only the local features useful for the recognition have to be stored.

In view of this, the present inventors have focused on a local region, which is consistently extracted to some extent, from a set of images continuously change, and have reached a new discovery that only the local features extracted from the region described above are used. If only the local features described above are stored in the database, the memory reduction is expected to be attained without deteriorating the precision in the object recognition. In order to enhance the effect of reducing memory, the present inventors have also considered that the local features extracted from the same part of the object are clustered and stored as one group in the database. Specifically, a subspace is spanned by each set of the local features described above by applying the technique known as CLAFIC method (for example, see Kenichiro Ishii, Eisaku Maeda, Naonori Ueda, Hiroshi Murase, "Plain Pattern Recognition", Ohmsha Ltd., 1998, August, p. 147-151, or E. Oja: "Subspace methods of pattern recognition", Research Studies Press (1983). This will be described in embodiments described below). With this method, the plural local features can be clustered to be represented as one group.

The present invention is accomplished in view of the above-mentioned circumstance, and aims to provide a method of selecting local features, which are to be stored in an image database that is used for a three-dimensional object recognition, for attaining a memory reduction, and being capable of suppressing a reduction in a recognition rate, which is caused because of the selection of the local features, to an extent almost equivalent to that in the case where all local features are stored.

Means for Solving the Problems

The present invention provides a method of compiling an image database for a three-dimensional object recognition comprising the steps of: when a plurality of images each showing a three-dimensional object from different viewpoint are inputted, extracting local features from each of a plurality of images, and expressing the local features using respective feature vectors; forming sets of the feature vectors, each set representing the local feature of a same part of the object from a series of the viewpoints neighboring one another, and generating subspaces using a subspace method, each subspace representing a characteristic of each set; and storing each subspace to the image database in association with an identifier of the object, wherein the image database is accessed by a computer to perform a recognition process of the three-dimensional object, and the recognition process is realized by the steps of: when one image of an object from a certain viewpoint or a plurality of images of the object from a series of viewpoints are given as a query, extracting a plurality of feature vectors as query feature vectors representing local features of the query; determining the subspace most similar to each query feature vector; and executing a counting process to the identifiers, each identifier being associated with each subspace, to retrieve a three-dimensional object most similar to the query.

In another aspect, the present invention provides an apparatus of compiling an image database for a three-dimensional object recognition comprising: an extracting section that, when a plurality of images each showing a three-dimensional object from different viewpoint are inputted, extracts local features from each of a plurality of images, and expresses the local features using respective feature vectors; a subspace generating section that forms sets of the feature vectors, each set representing the local feature of a same part of the object from a series of the viewpoints neighboring one another, and generates subspaces using a subspace method, each subspace representing a characteristic of each set; and a storing section that stores each subspace to the image database in association with an identifier of the object, wherein the image database is accessed by a recognition apparatus of the three-dimensional object, and the recognition apparatus has functions of: when one image of an object from a certain viewpoint or a plurality of images of the object from a series of viewpoints are given as a query, extracting a plurality of feature vectors as query feature vectors representing local features of the query; determining the subspace most similar to each query feature vector; and executing a counting process to the identifiers, each identifier being associated with each subspace, to retrieve a three-dimensional object most similar to the query.

Effect of the Invention

The method of compiling an image database for a three-dimensional object recognition includes the step of forming sets of the feature vectors, each set representing the local feature of a same part of the three-dimensional object from a series of the viewpoints neighboring one another, and generating subspaces using a subspace method, each subspace representing a characteristic of each set; and a step of storing each subspace to the image database in association with an identifier of the three-dimensional object. Therefore, the feature vectors representing the same part of the object can be clustered and transformed into a similar subspace for the continuous change in the viewpoint, and the subspace is stored in the database instead of each feature vector, whereby the memory reduction can be realized, and the reduction in the recognition rate, which is caused because of the selection of the local features, can be suppressed to an extent almost equivalent to that in the case where all local features are stored.

According to an experiment for verifying the effects, the present invention is successful to reduce the memory down to about $1/18$ of the memory for storing all local features, while it is capable of keeping the recognition rate of 98.3% of the rate when all local features are stored.

The apparatus of compiling an image database for a three-dimensional object recognition, corresponding to the above-mentioned method, provides the same operation and effects.

In the method of compiling an image database for a three-dimensional object recognition, each step for compiling the database is realized by a computer. This computer and a computer executing the recognition process may be the same, or may be different from each other. The computer here may be a single computer, or may include a form in which plural devices realize a function of one computer in a physical manner such as a so-called cloud computing.

Different from a two-dimensional (plane) object, a three-dimensional object is an object whose part is in and out of someone's vision according to a change in a viewpoint (shooting angle). The subspace can be generated by applying a known subspace method. One aspect of the feature of the present invention is that the feature vectors of a same part of an object from a series of viewpoints are clustered to be represented as one group by the subspace method to reduce the memory amount of the database.

Another aspect of the feature of the present invention is that viewpoint data representing a series of viewpoints is added to the subspace that is a set of clustered feature vectors. A specific embodiment of the viewpoint data is a shooting angle. In embodiments described below, the shooting angle corresponds to a rotation angle of a turntable on which a three-dimensional object is placed, when the object on the turntable is shot from different directions by 360-degree turn.

BRIEF DESCRIPTION OF THE DRAWINGS

FIG. 1 is an explanatory view for describing a state in which SIFT features that are conventional local features are respectively extracted from each of images of an object from two different viewpoints.

FIG. 10 is an explanatory view illustrating images of the object A, used in the experiment 1 in the present invention, from a shooting angle of 68 degrees and a shooting angle of 69 degrees.

BEST MODE FOR CARRYING OUT THE INVENTION

Figure 2:
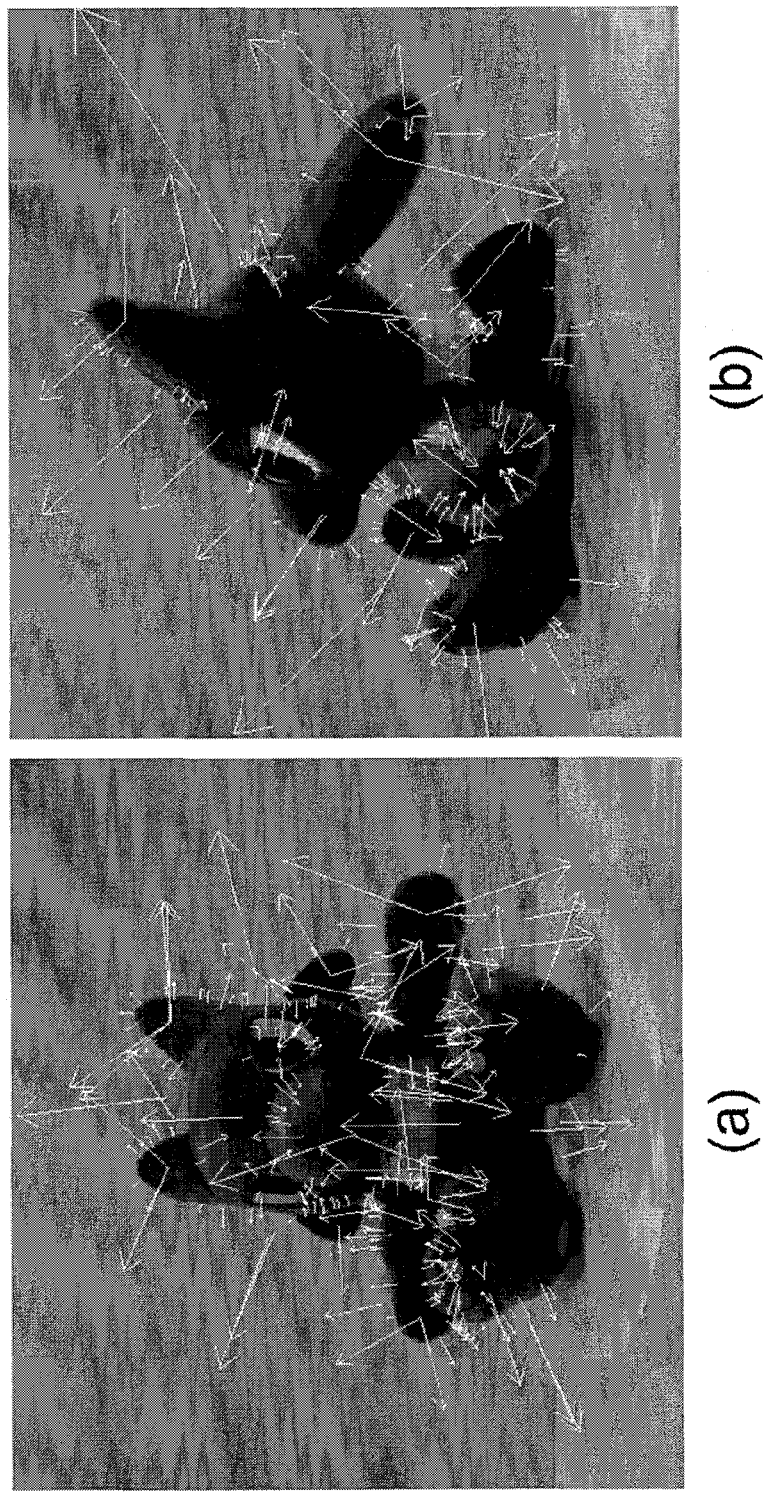
FIG. 2 is an explanatory view for describing a state in which SIFT features that are conventional local features are respectively extracted from each of images of an object, different from the object in FIG. 1, from viewpoints different from those in FIG. 1.

Preferable embodiments of the present invention will be described below.

In the method of compiling an image database for a three-dimensional object recognition, the storing step may store a combination of the identifier of the object and viewpoint data representing the series of the viewpoints in association with each subspace, and the recognition process may execute a counting process to the combinations associated with the respective subspaces, in order to retrieve the most similar object and a most similar viewpoint to the query.

With this process, the counting process is executed to the combination of the object ID and the viewpoint data for each query feature vector, whereby the reduction in the recognition rate, which is caused because of the memory reduction, can be suppressed to an extent almost equivalent to that in the case where all feature vectors are stored.

According to the experiment described later for verifying the effects, the present invention is successful to reduce the memory down to about $1/18$ of the memory for storing all features vectors, while it is capable of keeping the recognition rate of 98.9%.

With this process, not only the type of the object of the query image can be recognized, but also the viewpoint of the query can roughly be estimated.

The subspace generating step may calculate the distance between respective pair of feature vectors corresponding to the neighboring viewpoints in each set, exclude the pair as a noise when the distance differs more than a prescribed criteria from distances acquired from the different pairs, and regard the rest of the feature vectors as the set of feature vectors representing the same part of the three-dimensional object. With this process, the set of feature vectors representing the same part can be acquired by the calculation of the distance between each pair of feature vectors corresponding to the neighboring viewpoints, and the set of feature vectors can stably be acquired with the noise being excluded.

The subspace generating step may generate the subspaces when the feature vectors in each set cover an equal or more amount of a predetermined viewpoint-change, and avoid generating the subspaces when the feature vectors in each set cover less amount of the predetermined viewpoint-change. With this process, the feature vectors representing the same part can be stored in the database over a wide viewpoint change. Accordingly, the noise generated due to the change in the shooting angle is excluded from the subjects to be stored, so that stable and highly-precise recognition can be realized.

The subspace generating step may exclude the pair as a noise when the difference between the distance regarding the nearest pair and the distance regarding the second nearest pair exceeds the prescribed criteria.

The recognition process may project each query feature vector to a basis determining a coordinate system of each of the subspaces previously stored in the image database to calculate the similarity between each query feature vector and each subspace based upon a size of a projection component, and may determine the subspace with the highest similarity as the subspace that is most similar to the query feature vector. With this process, the similarity can be calculated based upon the size of the projection component to the basis of each subspace.

The recognition process may determine a basis of a first principal component involved with a maximum eigenvalue for each subspace in a set of feature vectors whose characteristic is represented by each subspace, may plot points on positions, distant from an origin with a normalized equal distance, on each basis of the first principal component, may obtain the distance between each point and each query feature vector by applying an approximate nearest neighbor searching method, and may determine the subspace with the shortest distance as the subspace that is most similar to the query feature vector. With this process, the similarity is calculated by applying the distance calculation, and the approximate nearest neighbor searching method is applied to this distance calculation, so that the processing time required for the calculation of the similarity can be reduced more than the method in which the feature vectors are projected to each basis.

The recognition process may also select some candidates for the subspace similar to each query feature vector by the above-mentioned method, and after that, may project the query feature vector to each basis of each subspace that is determined as the candidate to calculate the similarity between each query feature vector and each subspace based upon the size of the projection component, and may determine the subspace with the highest similarity as the subspace most similar to the query feature vector.

With this process, a high recognition rate can be expected, compared to the case in which only the first principal component of each subspace is used. On the other hand, the processing time can be reduced, compared to the case in which the similarity is obtained by projecting each feature vector to each basis of each subspace, because the target (candidate) for the similarity calculation is narrowed down.

Instead of the process of determining the subspace most similar to each query feature vector, the recognition process may be realized by the steps of: (1) when a plurality of images of an object from a series of viewpoints are given as a query, generating a plurality of sets each including query feature vector involved with the query, each set representing local features of the same part of the object viewed from viewpoints neighboring each other, and generating a plurality of query subspaces each representing the characteristic of each set by a subspace method, (2) plotting query reference points on positions, distant from an origin with a predetermined normalized distance, on each basis determining a coordinate system of each query subspace, and plotting reference points on positions, distant from an origin with a predetermined normalized distance, on each basis of each subspace stored in the database, and (3) determining the subspace having the reference point distant from each query reference point with the shortest distance by applying an approximate nearest neighbor searching method, in order to determine the subspace most similar to each query subspace.

With this process, the subspace that is most similar to each query subspace can be determined by the distance calculation employing the approximate nearest neighbor searching method. Accordingly, the processing time can be reduced more than in the case where the approximate nearest neighbor searching method is not used, and higher recognition rate can be expected than in the case where a subspace most similar to each query feature vector is determined, since each subspace is compared to each query subspace.

The viewpoint data may be data indicating a shooting angle of the object. According to this, the shooting angle is used as the viewpoint data, and the subspace can be generated by considering the situation that the vectors on the same part are continuously included with respect to the amount of change in the shooting angle, as a condition of eliminating noise.

The subspace generating step may generate the subspaces by forming the set from the feature vectors using a CLAFIC method.

A number of dimensions of the subspace may be 1 or more and 3 or less. The SIFT feature used in the embodiment has 128-dimensional vector. However, the number of dimensions can be reduced by converting the vectors into the subspaces. However, it is expected to cause a trade-off between the reduction in the dimensional number and the reduction in the recognition rate, so that how many the dimensional number can be reduced has to be determined by considering the balance between them. On the other hand, according to the experiment described later for verifying the effects, the recognition rate of 98.9% with respect to the recognition rate of storing all vectors could be maintained even when the number of dimensions of the subspace was 3 in the embodiment in which the viewpoint data was added, which was a surprising result to the inventors. Even when the number of dimensions increased more, the recognition rate of 98.9% or more could not be attained. Even when the number of dimensions was reduced to 1 that was the minimum, the recognition rate of 98.0% with respect to the recognition rate of storing all vectors could be maintained (see FIG. 6 and Table 1). Even in the embodiment in which the viewpoint data was not added, the recognition rate of 98.3%, which was the maximum, could be attained when the number of dimensions of the subspace was 3, and even when the number of dimensions was reduced to 1, the recognition rate of 95.8% could be maintained.

Various preferable embodiments described here can be combined to one another.

The present invention will be described in more detail with reference to the drawings. It is noted that the description below is merely an example in all aspects, and should not be deemed to limit the present invention.
<Related Work>

Before describing the present invention in detail, a related work that is the basis of the present invention will be described in some detail for easy understanding of the technical meaning of the present invention.

1. Three-Dimensional Object Recognition by Using Local Features

Features extracted from an image are roughly classified into global features and local features. The former represents one entire image by using pixel values of the image, and it can relatively easily be extracted. However, when pixel values are totally different between the image in the database and the query image, such as the case where only a part of an object is shown in an image, or where a part of the object is occluded, the features greatly vary, so that it is difficult recognize an object. On the other hand, the local features are extracted such that characteristic local regions are extracted from an image, and the local regions are described with vectors. Since the local features are described as vectors as described above, the local features are also referred to as feature vectors. It has been known that the local features are effective to solve the problem involved with the global features, since hundreds to thousands of local features in total can be extracted from various parts of one image.

SIFT feature that is one of representative local features (e.g., see D. Lowe: "Distinctive image features from scale-invariant keypoints", International Journal of Computer Vision, 60, 2, pp. 91-110 (2004)), and a basic method of recognizing a three-dimensional object by using local features (see Non-Patent Document 4) will briefly be described.

1-1. SIFT (Scale-Invariant Feature Transform) Feature

SIFT features proposed by Lowe et al represent coordinates, orientations, and sizes of local regions, which are extracted by utilizing a brightness gradient in an image, with feature vectors. The SIFT feature is represented by vector of dimensions of 128, and it is robust for transformation such as similar transformation and rotation.

FIG. 1 is an explanatory view for describing a state in which SIFT features that are conventional local features are respectively extracted from each of image data of an object from two different viewpoints. FIGS. 1A and 1B illustrate the same object shot at different shooting angles. White arrows in the figure indicate SIFT features. FIG. 2 is an explanatory view for describing a state in which SIFT features that are conventional local features are respectively extracted from each of image data of an object, different from the object in FIG. 1, from viewpoints different from those in FIG. 1.

1-2. Recognition Method of Three-Dimensional Object

A recognition method of a three-dimensional object will briefly be described. Firstly, a storage to a database will be described. It is supposed that images formed by shooting an object, which is intended to be stored in a database, from various viewpoints (shooting angles) are prepared by a user. A computer extracts SIFT features from each image formed by shooting the object to be stored, as a storage process. The extracted SIFT features are stored in the database together with an identifier (object ID) specific to the object. The object ID is used to identify each object stored in the database.

A recognition process will next be described. It is supposed that an object serving as a query is shot from a certain viewpoint, and an image formed by shooting the object is prepared. In the recognition process, the computer retrieves whether the object same as the query is stored in the database or not, and if the same object is stored in the database, the object ID of this object is specified. The procedure of the recognition process is as stated below. As in the storage process described above, SIFT features are also extracted from the query image. A distance between each of the extracted SIFT features and each of the SIFT features stored in the database is calculated. The SIFT feature with the shortest distance from the SIFT feature of the query image, i.e., the nearest SIFT feature, is found. The object ID of the object to which the nearest SIFT feature belongs is voted. As for the other SIFT features of the query image, a vote is cast for any one of object IDs. The object ID with the highest votes as a result of the voting process is defined as a result of the recognition for the query image.

2. CLAFIC Method—Classification of Local Features

CLAFIC method (CLAss-Featuring Information Compression) is one of subspace methods proposed by Watanabe in 1969, and it is a method of classification by using a subspace formed by KL expansion (it is an abbreviation of Karhunen-Loeve expansion, and it is a method of acquiring a subspace that approximates best the distribution of vectors) for each class. In the present invention, it is considered that the local features of the same part extracted from plural images of a certain object from different shooting angles are clustered into the same class by using the CLAFIC method. This is a clustering of local features.

In order to generate a subspace according to the CLAFIC method, many sample vectors x are prepared for each class, and an autocorrelation matrix Q of each vector is calculated from an equation described below.

$$Q = E\{xx^T\} \quad \text{[Equation 1]}$$

Then, when $\lambda i$ is defined as an eigenvalue of Q, and $u_i$ is defined as an eigenvector thereto, an eigenvector is acquired by solving the problem of the eigenvalue.

$$Q u_i = \lambda_i u_i \quad \text{[Equation 2]}$$

When there are n original sample vectors x, n eigenvectors are determined, in general. Among n eigenvectors, a space spanned by some eigenvectors is called subspace. When the number of dimensions of the subspace that is intended to be acquired is defined as k, a space having an eigenvector:

$$\{u_1, u_2, \ldots, u_k\} \quad \text{[Equation 3]}$$

corresponding to the high-order k large eigenvalues as a basis (coordinate system) is the subspace to be acquired. The eigenvalue involved with a basis $u_i$ of a certain sample vector x corresponds to a length (projection component) when the sample vector x is orthographically projected to the basis $u_i$. The basis $u_i$ is the basis corresponding to the maximum eigenvalue in the whole class, and it is referred to as a first principal component in the specification. The subspace is formed for each class, and a similarity D with a vector x' of an unknown pattern is calculated, whereby the class of the unknown pattern can be identified. The vector x' of the unknown pattern is identified into the class of the subspace having the maximum projection component.

The similarity D can be obtained from an equation 4.

$$\|D\|^2 = \sum_{i=1}^{k} (x^T u_i)^2 \quad \text{[Equation 4]}$$

<Description of Present Invention>

As described in the recognition method of a three-dimensional object, all local features (feature vectors) extracted from images formed by shooting an object from various viewpoints (shooting angles) are stored in the database in order to achieve a high-precise recognition result according to the conventional method of an object recognition using SIFT features. Therefore, a huge memory has to be needed. In view of this, in the present invention, local features of the same part extracted from image data from a series of viewpoints are clustered to be represented as one group by using a subspace, and the clustered features are stored in the database for realizing the memory reduction. Since the information of the shooting angle is associated with the subspace, the shooting angle of the query is roughly acquired together with the object recognition.

1. Selection of Local Features

As a countermeasure for a problem of a huge memory needed to store local features, the reduction in the number of local features stored in the database is considered. However, when the local features are randomly reduced, the recognition rate might be reduced significantly. Therefore, the present invention focuses on some local region, which is extracted from plural image data indicating the same object and having a shooting angle continuously changed, and which has consistency to some extent, and aims to use only the local features extracted from this local region for the object recognition. This is because, if local features, having consistency to some extent to the change in the shooting angle, cannot be extracted for a certain local feature, this local feature is highly possibly noise generated by the change in the shooting angle. In the plural image data formed by continuously changing the shooting angle, the local features extracted from the same part of the object slightly change. A subspace that can precisely and approximately describe the change in the local features is generated to represent plural local features as one group.

The process of finding the local features extracted from the same part of the object from plural image data formed by continuously changing the shooting angle is as stated below. In two image data formed by shooting an object from slightly different angles, the distance between each local feature in the image data of the first frame and each local feature of the image data of the second frame is firstly calculated. The nearest local features are respectively found, whereby the local feature in the image of the first frame and the local feature in the image of the second frame are associated with each other. In this case, there may be the case in which the nearest local feature is extracted from a part that is of little relevance due to the influence caused by noise. Therefore, when the distance with the nearest local feature is defined as d1, the distance with the second nearest local feature is defined as d2, and a threshold value is defined as α, only sets of the local features satisfying an equation 5 are considered to be extracted from the same part of the object.

$$\frac{d_1}{d_2} < \alpha \quad \text{[Equation 5]}$$

The local features not satisfying this equation are considered to be noise. This process is performed to all continuous image data to acquire a trace of the local features. This process is referred to as a trace process below. The trace can be said to be a set of feature vectors. The method of comparing the difference between the distance with the nearest local feature and the distance with the second nearest local feature and the threshold value in order to eliminate the noise has been described above. However, as the modification thereof, a method is considered in which the difference between the distances with the local features extracted from the closer parts in the image are compared to the threshold value in order to eliminate the noise.

Figure 3:
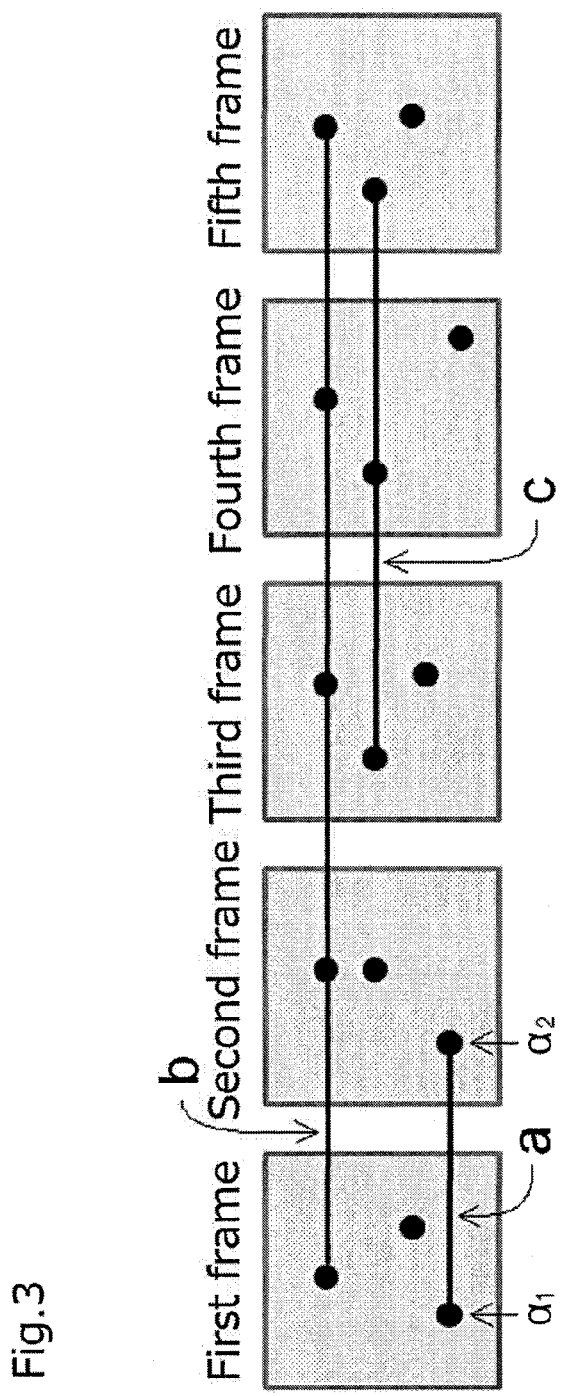
FIG. 3 is an explanatory view schematically illustrating a trace process according to the present invention.

FIG. 3 is an explanatory view schematically illustrating the trace process according to the present invention. The rectangle frames such as the "first frame" or the "second frame" indicate the respective images formed by shooting an object from different viewpoints. a, b, and c indicate traces on which feature vector representing the same part of the object continuously appears in the images from different shooting angles (viewpoints). For example, the feature vector set a means that is a feature vector α1 belonging to the first frame is associated with a feature vector α2 belonging to the second frame, but the feature vector α2 belonging to the second frame is not associated with any feature vectors in the third frame. The feature vector set b indicates that the feature vectors are continuously associated with each viewpoint from the first frame to the fifth frame. The feature vector set c indicates that the feature vectors are continuously associated with the respective viewpoints from the third frame to the fifth frame.

2. Generation of Subspace, Storage Process

In the storage process according to the present invention, the computer clusters the sets of the local features obtained by the trace process by generating the subspace of each set. The computer stores the subspace together with the object ID. In this case, when the subspace is generated and stored from the set of local features with the short trace like the trace a in FIG. 3, the number of subspaces to be stored increases, which does not contribute to the memory reduction. In view of this, a threshold value is applied to the length of the trace, and the subspace is generated only from the set of local features continuously associated in a certain length, and stored in the database. This is because the set of local features with the short trace has less recognizable shooting range compared to the set with the long trace.

The subspace generated in the present invention is specifically formed of k orientation vectors determining a k-dimensional basis (coordinate system). Each trace corresponds to the class described in the CLAFIC method. The sample vector x in each class corresponds to the local feature belonging to each trace. The autocorrelation matrix of the local feature is obtained according to the CLAFIC method, and the subspace having the eigenvector as the basis is spanned. k eigenvectors forming the subspace are only stored in the database. The stored eigenvectors approximately represent each local feature belonging to the subspace.

Figure 6:
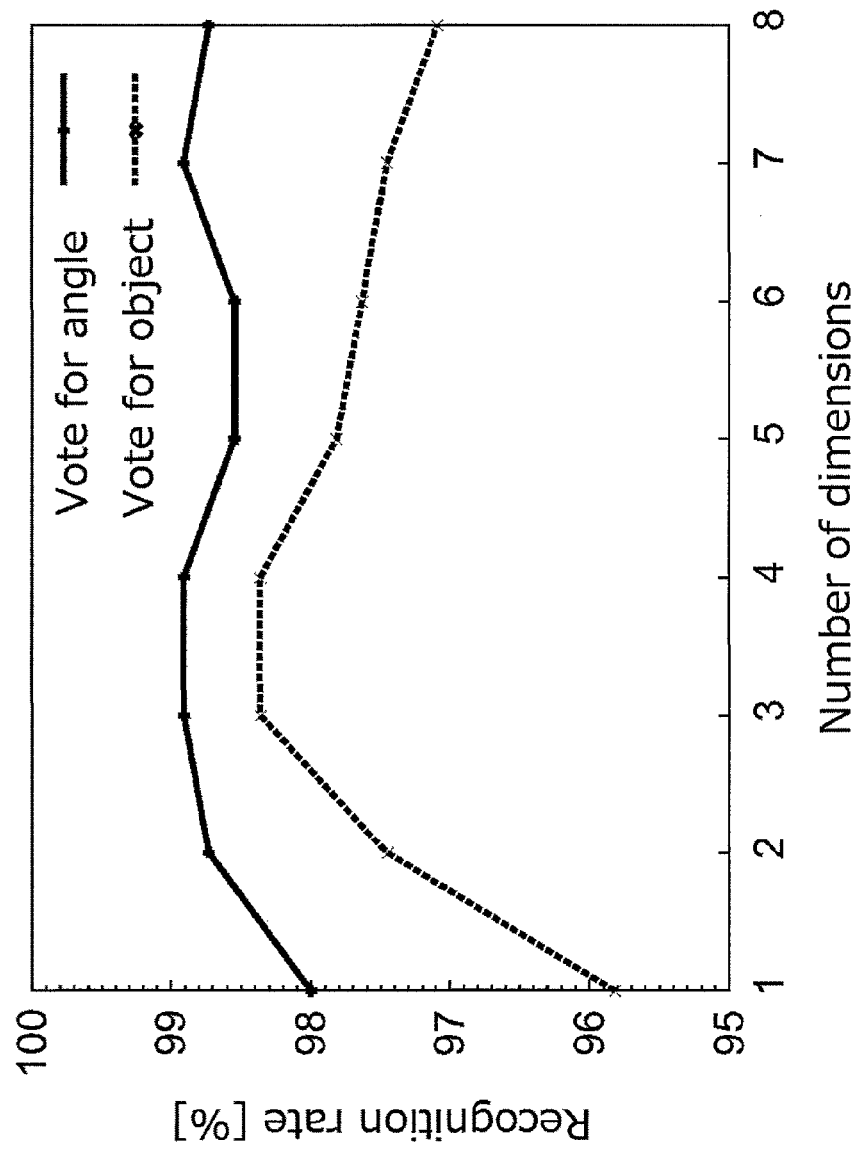
FIG. 6 is a graph illustrating how much a recognition rate is affected by the voting process considering an operation angle.

The smaller the number of dimensions k of the subspace is, the greater memory reduction can be realized. Since the SIFT feature is represented by a vector of 128 dimensions, the number of dimensions k of the subspace is 1 or more and 128 or less. In experiments described later, the number of dimensions k of each subspace is uniformly determined. Specifically, as illustrated in FIG. 6, 8 cases in which k is 1 to 8 are set, and the experiment is performed to each case. However, the number of dimensions k may adaptively be determined for each subspace.

As described previously, in the storage process, not only the local features but also the subspace in which sets of local features are clustered is stored in the database together with the object ID. In this case, the range of the shooting angle of this subspace, specifically, the range of the viewpoints in which the change in the local features is represented by the stored subspace, is stored together. Since the information of the shooting angle is used during the recognition process, the recognition rate can be enhanced, and a parameter as to from which viewpoint the query image is shot can roughly be detected. Accordingly, in the storage process, the subspace is stored as being associated with the object ID and the range of the shooting angle.

3. Recognition Process

In the recognition process according to the present invention, when an image of a query is applied, the computer extracts local features from the query image, and projects each local feature to each subspace in the database, so as to calculate similarity between the local feature and the subspace. The computer acquires the subspace with the highest similarity, and cast a vote for the object ID having this subspace. This process is carried out for all local features. The computer finally outputs the object ID with the highest votes as a result of the object recognition. In this case, the number of the subspaces is different depending upon an object, so that the votes are normalized with the number of subspaces. If the normalization is not carried out, many votes are collected to the object ID with many subspaces, which might cause erroneous recognition. When the number of subspaces that can identify a certain shooting angle ω of an object is defined as Nω, and the number of votes of the shooting angle ω is defined as Gω, the number of votes is normalized according to an equation 6.

$$G'_\omega = \frac{G_\omega}{\sqrt{N_\omega}} \quad \text{[Equation 6]}$$

Figure 4:
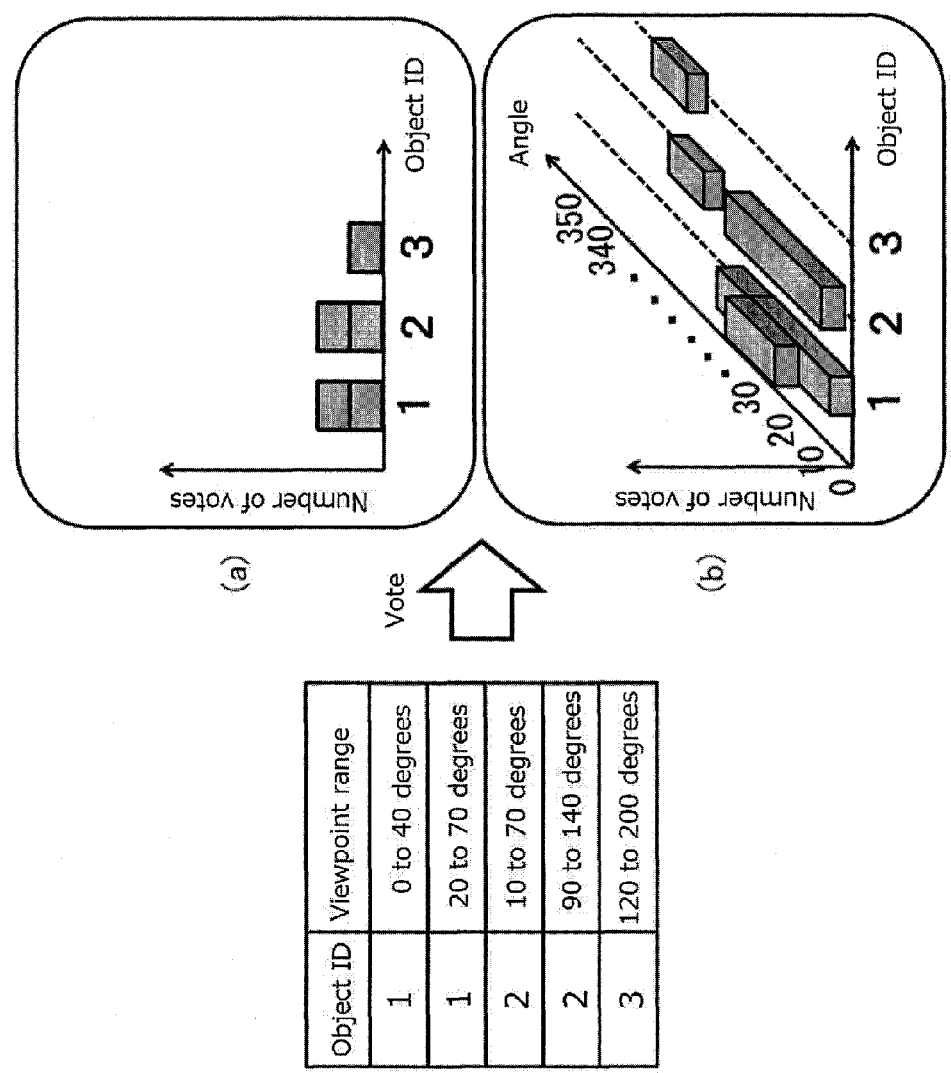
FIG. 4 is an explanatory view illustrating a voting process according to the present invention.

FIG. 4 is an explanatory view for describing the voting process according to the present invention. For example, it is supposed that, when subspaces having the highest similarity with five local features extracted from the query image are obtained, five subspaces each having the object ID and the shooting range illustrated in a left part in FIG. 4 are obtained. In this case, if the voting process is carried out only for each object ID in accordance with one embodiment of the present invention, the result illustrated in FIG. 4A is obtained. However, if the viewpoint ranges are totally different, although two local features are associated with the subspace having the same object ID, it can be said that they represent different objects. In view of this, in a different aspect of the present invention, the voting process is carried out in consideration of the shooting angle of the object as illustrated in FIG. 4B.

Specifically, the subspace with the highest similarity is obtained, and a vote is casted for the combination of the object ID used for generating the subspace and the shooting angle of the object from which the local features forming the subspace are extracted. FIG. 4 illustrates the case in which 5 subspaces are extracted from the query.

FIG. 4A illustrates the result of casting votes to only the object ID. According to the voting result illustrated in FIG. 4A, an object 1 and an object 2 collect the same highest votes, so that it cannot be determined which one is defined as the recognition result. On the other hand, FIG. 4B illustrates the result of casting votes to the combination of the object ID and the shooting angle. According to the voting result illustrated in FIG. 4B, the range of the shooting angle of 20 degrees to 40 degrees of the object 1 collects the highest votes, so that the object 1 can be determined as the recognition result. In addition, the shooting angle of 20 degrees to 40 degrees can advantageously be estimated as the rough shooting angle of the query image.

<Process Flow>

Figure 13:
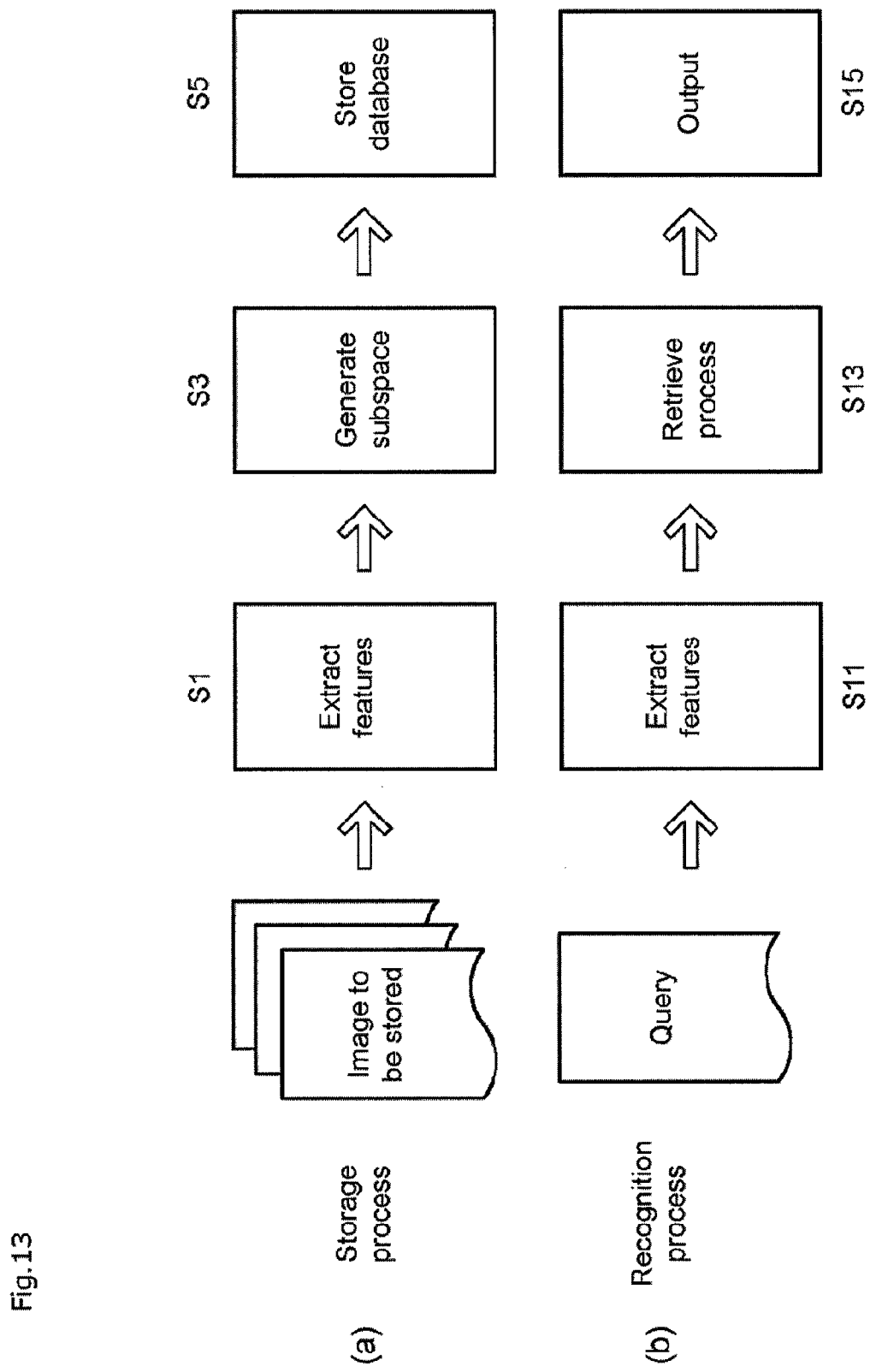
FIG. 13 is an explanatory view illustrating a flow of a process of a three-dimensional object recognition according to the present invention.

FIG. 13 is an explanatory view for describing a process flow of the recognition process of a three-dimensional object according to the present invention. As illustrated in FIG. 13, the recognition process of the three-dimensional object is roughly classified into the storage process and the recognition process. The storage process is the process of compiling an image database of three-dimensional objects used for the recognition. When an image of a three-dimensional object is given as a query, an image of the object shown in the image is retrieved from the database for specifying the object in the recognition process.

FIG. 13A illustrates a flow of the storage process, while FIG. 13B illustrates a flow of the recognition process.

In the storage process, plural images formed by shooting the same object from different viewpoints are used as inputs. When the inputs described above are given, the computer executing the storage process extracts local features from each image (step S1). The computer obtains the local features of the same part continuously included in the images from different viewpoints through the distance calculation, and generates a subspace in which the local features are clustered to be represented as one group (step S3). The computer then adds the identifier of the object and the range of the shooting angle of the viewpoint to the generated subspace, and stores the resultant to the database (step S5).

The recognition process is carried out on the assumption that plural data is stored in the database. In the recognition process, an image of the query is given as an input. The query is an image formed by shooting a certain object from a certain viewpoint. When the query is inputted, the computer executing the recognition process extracts local features from the query (step S11). The computer retrieves the most similar subspace to each local feature extracted from the query from the database. The computer determines one object ID through a majority vote for object IDs added to the retrieved subspace (step S13). Then, the computer outputs the object identified by the object ID in order that an operator can recognize the object (step S15).

The apparatus of compiling the database according to the present invention is a computer executing the processes involved with the storage from the viewpoint of an apparatus. Common hardware represented by the computer realizes the respective processes. If the program of each process is different, the function realized by the computer is also different. This corresponds to the situation in which plural components, each having different function, are combined to realize one apparatus as a whole, so that the invention can be grasped as an apparatus formed by combining sections realizing the function of the respective processes.

Specifically, when the invention is grasped as an apparatus, the present invention can be an apparatus of compiling a database including an extracting unit that has a function of an extracting process of local features; a subspace generating section that has a function of generating a subspace; and a storage section having a function of a storage to the database.

As for the recognition process, the present invention can be an apparatus including a section having a function of extracting local features from a query; a section having a function of retrieving a subspace that is most similar to each of the extracted local features, and a function of determining one object ID through a majority vote to the object ID added to this subspace; and a section having a function of outputting the determined object ID.

<Reduction in Processing Time>

In the method described above, a subspace is generated from a set of features extracted from the same local region over plural frames by using the KL expansion, whereby plural local features are clustered to be represented as one group. With this, the features to be stored in the database can significantly be reduced, so that the memory reduction can be realized.

However, the reduction in the processing time is another problem, although the memory reduction can be realized. In other words, in the above-mentioned method, the local features extracted from the query are projected to all bases of the subspaces in the database to obtain similarity during the recognition. Therefore, when the number of objects to be stored in the database increases, much time is needed to retrieve the proper subspace. If the proper subspace can be obtained by the distance calculation, instead of the process of obtaining the subspace corresponding to each local feature of the query by obtaining the similarity through the projection, the processing time is expected to be reduced. This is because the processing time taken for the distance calculation can be reduced by the approximate nearest neighbor searching method using ANN (abbreviation of Approximate Nearest Neighbor, see R. S. S. Arya, D. M. Mount and A. Y. Wu: "An optimal algorithm for approximate nearest neighbor searching", Journal of the ACM, pp. 891-923 (1988) for detail).

When the experimental condition is severe, i.e., when the number of the objects to be stored in the database is very large, or when an occlusion or a change in a lighting condition is added to the query, it is difficult to recognize an object only by the comparison between the local feature and the subspace. In the present embodiment, ANN is used for a mutual subspace method (see Maeda, Watanabe: "Pattern matching using local structure", The Transactions of the Institute of Electronics, Information and Communication Engineers (D), pp. 345-352 (1985) for detail), in order to realize enhanced recognition rate and high-speed process.

1. Specific Method of Reducing Processing Time

In the above-mentioned method of calculating the similarity with the k-dimensional subspace corresponding to each class, each query feature vector serving as a local feature has to be projected to each basis of the subspace corresponding to each class in the database to obtain the similarity. Therefore, the processing time increases with the increase in the number of objects to be stored in the database. In the present embodiment, a method of approximately retrieving the subspace with the highest similarity is employed to reduce the processing time.

1-1. Replacement to Distance Calculation Using ANN

The recognition process by the projection to the k-dimensional subspace entails a problem of increasing the processing time, since each query feature vector is projected to each basis of each subspace in the database to retrieve the subspace with the highest similarity. In view of this, the present embodiment proposes a method of obtaining the subspace with the highest similarity from the distance calculation between the local feature extracted from the query and the point on the first principal component of the subspace. If the subspace with the highest similarity can be obtained by the distance calculation, the process can be executed with high speed by various approximate nearest neighbor searching methods that have already been proposed.

The method of obtaining the subspace with the highest similarity by the distance calculation is as stated below. Firstly, points equally distant from an origin are plotted on the coordinate axis of each subspace in the database. The distance between each of these points and each of the local features extracted from the query is calculated. The shorter the distance is, the longer the projection length is when the local feature is projected to the corresponding subspace. That is, the subspace with the highest similarity can be obtained.

The above is the outline of the method of reducing the processing time through the distance calculation using ANN. The detail thereof will be described below.

The method called ANN has been proposed as one of approximate nearest neighbor searching methods. This method is based upon a tree structure (kd-tree), and this can be realized by using processing software, so that the ANN process can easily be tried. The outline of the ANN process will be described below.

Firstly, the feature space that is a set of local features (feature vectors) stored in the database is divided into two, and this process is repeated until only one feature vector is present in the divided region. The region finally obtained by dividing the space is referred to as a cell. Next, it is determined which cell contains the applied query feature vector by tracing the tree structure. Then, the distance r between the feature vector associated with this cell and the query feature vector is calculated. In this case, the true nearest point is present in a hypersphere with a radius r. Therefore, the nearest point can be found by the distance calculation with the feature vectors present in all cells overlapped with the hypersphere. In the ANN, the radius of the hypersphere is reduced down to $1/(1+\epsilon)$ to reduce the number of cells that are targets to perform the distance calculation. Thus, the significant reduction in the processing time and the high-speed process can be realized, although there is a risk of not finding a correct nearest point.

However, the ANN is a method of approximately obtaining the nearest point to a certain point, and this method cannot obtain the similarity between a local feature and a subspace. Therefore, in order to utilize the ANN in the subspace method, the subspace that is most similar to the local feature has to be obtained by the distance calculation. This embodiment describes the method of realizing this process.

As the prerequisite of the present embodiment, it is necessary that a set of original local features forming the subspace is satisfactorily expressed only by a one-dimensional subspace having only the eigenvector with the largest eigenvalue as a basis, i.e., only by a first principal component. In the method of using the k-dimensional subspace previously described, the sets of local features continuously changed is obtained by the trace process, and the subspace is generated from each set. Therefore, few outliers are present, and the set of local features can approximately satisfactorily be expressed by the one-dimensional subspace. In this case, it can be said that the similarity between the local feature and the subspace is inversely proportional to the distance between the local feature and the basis of the subspace. In other words, the subspace with the highest similarity can be obtained by obtaining the subspace nearest to the local feature.

The distance between the local feature and the basis of the subspace is generally determined as a length of a perpendicular from the local feature to the basis of each subspace. However, this method obtains the distance between a point and a line, so that the approximate nearest neighbor searching cannot be executed by using the ANN. Therefore, a point Si ($\|Si\|=1$) whose distance from the origin is normalized is plotted on the basis of each subspace, and the distance dSi between the point Si and the local feature is obtained. The distance between the local feature and the subspace cannot correctly be determined from this distance dSi. However, the magnitude relationship in the distance between the local feature and each subspace can be found. Specifically, the subspace with the minimum distance dSi is the nearest subspace, and hence, it is the subspace with the highest similarity.

1-2. Narrowing Down by Approximate Nearest Neighbor Searching

As described above, the processing time required for the recognition can be reduced more by the method of calculating the distance only by using the first principal component in the subspace, than by the method of obtaining the similarity to the k-dimensional subspace. However, more enhanced recognition rate can be realized by using plural axes of the subspace.

Therefore, a recognition method using two-step process can be taken as another embodiment. In this embodiment, as the first step, candidates that are supposed to be the subspace with the highest similarity are narrowed down by the approximate nearest neighbor searching with high speed only by using the first principal component in the subspace. As the second step, each feature vector is high-dimensionally projected by using plural axes of each subspace that is the candidate, in order to obtain the subspace truly having the highest similarity. By adding the second step, the enhanced recognition rate can be expected, compared to the case where only the first principal component of each subspace is used. On the other hand, the processing time can be reduced, compared to the case of using only the second step, i.e., compared to the case in which each feature vector is projected to the basis of each subspace, because the targets (candidates) for the similarity calculation are narrowed down.

1-3. Use of ANN in Mutual Subspace Method

This embodiment is effective for the case in which a moving picture or plural images continuously formed are used as a query. According to this embodiment, the trace process is performed to the plural images involved with the query, as in the case of compiling the database. The subspace is formed from a set of local features extracted by the trace process. With this, the subspace in the database and the subspace acquired from the query image can be compared. The subspace acquired from the query is referred to as a query subspace in this specification. In order to find the optimum subspace through the comparison of the subspaces, a canonical angle of each subspace is generally used. However, a high-speed process cannot be expected by this method. Therefore, the optimum subspace is found by the distance calculation even in this process. As in the distance calculation in the ANN previously described, points equally distant from an origin are plotted on the axis of each subspace, and the distance between each of these points is calculated. Since the query is also the subspace in this embodiment, it should be noted that points are also plotted on the coordinate axis of the query subspace. The detail will be described below.

The mutual subspace method is used for the case in which a moving picture or images from plural viewpoints can be utilized as a query. A query subspace is also generated from a set of local features extracted from the query, and the query is recognized by the comparison between the query subspace and the subspace in the database. Since the subspace has fewer variations than the local feature, a high recognition rate can be expected by using the subspace as the query. The similarity between the query subspace formed from the query and the subspace in the database can be calculated by calculating the canonical angle made by both subspaces. However, the calculation of the canonical angle requires enormous processing time.

Therefore, in order to realize the reduction in the processing time, it is considered to reduce the processing time by using ANN even in this embodiment. Firstly, a point Si distant from an origin with a distance 1 is plotted on each basis of each subspace to be stored in the database. A suitable point Q is also plotted on the basis of the query subspace acquired from the query. In this case, the subspace having the point Si, which is apart from the point Q with the minimum distance, on the basis is the target subspace. The point Si apart from the point Q with the minimum distance can approximately be obtained by using the ANN. Accordingly, the comparison between the query subspace and the subspace in the mutual subspace method can be realized in a short processing time.

<Experiment 1>

Experiments were carried out for comparing the basic conventional method of the object recognition using the local features and the method of representing plural local features by a subspace according to the present invention. The index of the comparison is a memory and a recognition rate.

1-1. Description of Experiment

A data set used in this experiment will be described. In this experiment, 55 three-dimensional objects were put on a turntable, and a moving picture was taken, as the turntable rotated one revolution.

Figure 5:
FIG. 5 is an explanatory view illustrating some objects used in an experiment 1 according to the present invention.

FIG. 5 is an explanatory view illustrating some examples of the objects used in the present experiment according to the present invention. Each frame image forming the moving picture was acquired, and an image to be stored in the database and a query image were formed from the acquired frame image. 360 images for each object were formed as the images to be stored by changing the shooting angle by about 1 degree. 10 images for each object were formed as the query images by changing the shooting angle by about 36 degrees. The image to be stored and the query image were different from each other. Specifically, the image to be stored that was totally equal to the query image was not present. SIFT features were extracted from the image to be stored in order to compile the database. About 100 to 400 local features were acquired from one image to be stored. If 300 local features were extracted from one image to be stored, the local features for one object were 300×360=108,000, so that the total number of the local features for 55 objects was 55 times that number, that is, 5,940,000. There were 550 query images (10×55) in total. Since the object recognition was executed to each image, at most 550 object recognitions were performed. An ordinate axis in FIG. 6 indicates the average recognition rate of these object recognitions.

The local features that were continuously associated in the number of 20 or more were selected from these local features by the trace process described above. Specifically, the local features associated over a range of the shooting angle of 20 degrees or more were regarded as the local features to be stored. In this case, the threshold value $\alpha$ (see the above-mentioned [Equation 5]) for determining whether or not the local features were those extracted from the same part of the object during the trace process was determined as 0.6. The subspace formed from sets of each local feature was obtained. The object ID and the range of the corresponding shooting angle were added to the obtained subspace, and the resultant was stored in the database. The number of the subspaces acquired from one object was about 100 to 400.

1-2. Experimental Result, Consideration

A first experiment was carried out for checking how much influence was given to the recognition rate by the voting in consideration of not only an object but also its shooting angle as illustrated in FIG. 4B during the recognition process according to the present invention.

FIG. 6 is a graph illustrating the result of the first experiment according to the present invention. An abscissa axis indicates the number of dimensions of the used subspace, while the ordinate axis indicates the recognition rate. From the experimental result, the recognition rate of more than 95% was attained, even if a vote was cast to each object ID, and when the number of dimensions of the subspace was 3, the recognition rate became 98.3%. When the votes were cast for each shooting angle of the object, erroneous votes were dispersed, so that the recognition rate was more enhanced, regardless of the dimension of the subspace. When the vote was cast not to an object ID alone but to the combination of the object ID and the shooting angle, the recognition rate became 98.9% when the number of the dimensions of the subspace was 3. Surprisingly, the recognition rate of 98.9% or more could not be attained, even if the number of the dimensions increased more. This is considered because the overlapped portion between the subspaces increases to deteriorate the discrimination of the subspace, when the number of dimensions of the subspace increases. Specifically, not only the similarity with the target subspace was enhanced, but also the similarity with the other subspaces might be increased.

Figure 7:
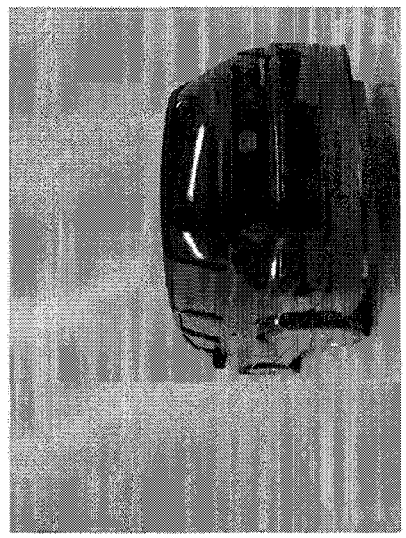
FIG. 7 is an explanatory view illustrating an object A used as a query in the experiment 1 according to the present invention.

FIG. 7 is an explanatory view illustrating an object A used as a query in the experiment of the present invention.

Figure 8:
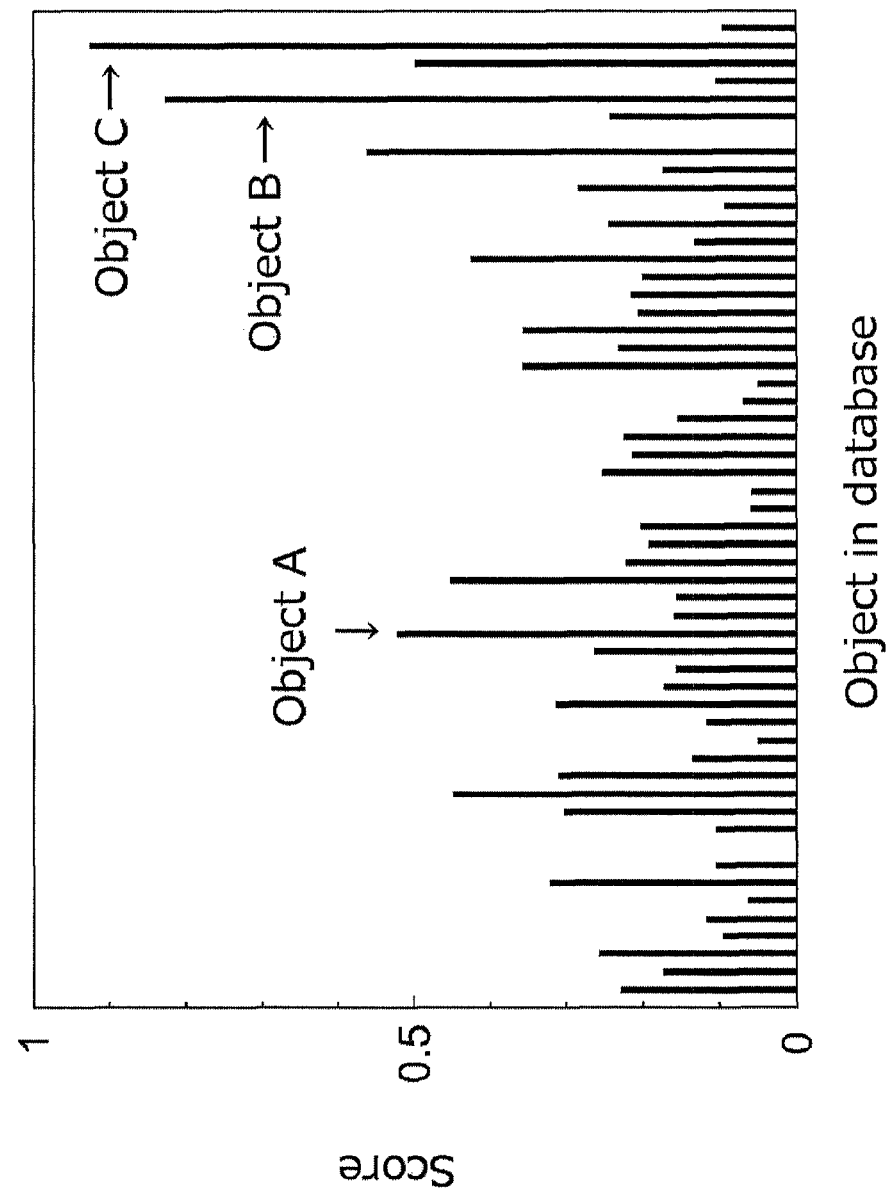
FIG. 8 is a graph illustrating a result of casting a vote for an object ID alone of the object A in FIG. 7.

FIG. 8 is a graph illustrating a result when a vote was cast only for an object ID of the object A in FIG. 7.

Figure 9:
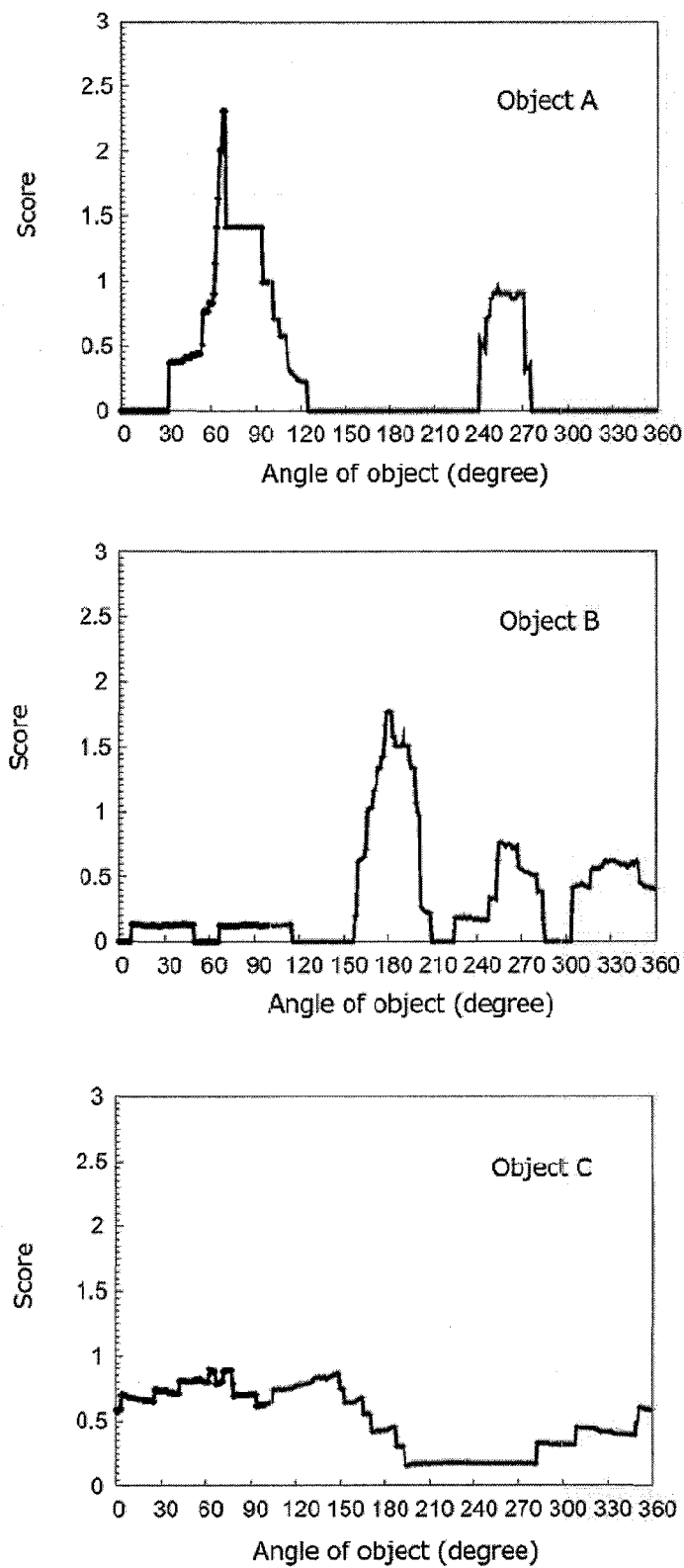
FIG. 9 is an explanatory view illustrating a result of casting a vote for a combination of an object ID and a shooting angle of the object A in FIG. 7.

FIG. 9 is an explanatory view illustrating an example in which the object A can correctly be recognized by voting to the combination of the object ID and the shooting angle. The query image in FIG. 7 was formed by shooting the object A from a certain shooting angle. FIG. 8 illustrates scores obtained by voting to each object ID and by normalizing the number of votes. Originally, the score of the object A should be the highest. However, the scores of another object B or object C became higher. Therefore, the query image was recognized as the object C, when a vote was cast for each object.

On the other hand, FIG. 9 illustrates the scores at each shooting angle of the object A, the object B, and the object C, when a vote was cast for the combination of the object ID and the shooting angle. In the object C that obtained the highest score when a vote was cast for only the object ID, the number of votes was dispersed because the vote was cast for the combination of the object ID and the shooting angle, so that the score decreased. For the object A, the shooting angle within a certain range got votes. Therefore, although the object C was recognized as the result when only the object ID was voted, the object A was correctly recognized when the combination of the object ID and the shooting angle was voted. In this case, not only the recognition was made, but also 68 degrees and 69 degrees for the object A with the highest score could be estimated as a rough shooting angle of the query image.

FIG. 10 is an explanatory view illustrating images of the object A, used in the experiment of the present invention, from an angle of 68 degrees and an angle of 69 degrees. FIG. 10A is the image from 68 degrees, while FIG. 10B is the image from 69 degrees. As understood form FIG. 10, the shooting angle of the object A can correctly be estimated. On the other hand, the case where an object could not be recognized according to the present invention will be described below.

Figure 11:
FIG. 11 is an explanatory view illustrating an object D used in the experiment 1 in the present invention.
Figure 12:
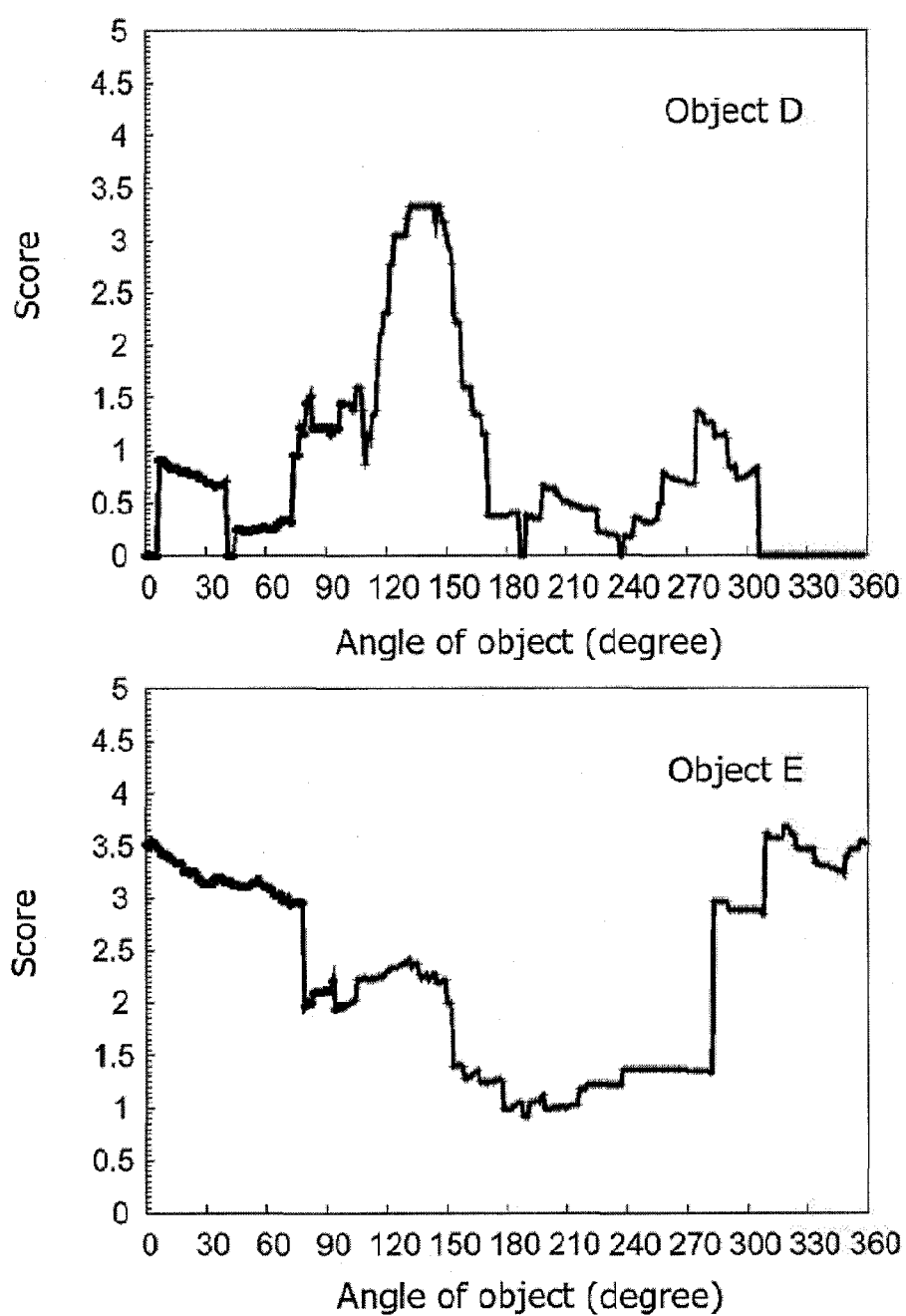
FIG. 12 is a graph illustrating scores to the respective shooting angles of the object D and an object E, when the object D in FIG. 11 is used as a query image.

FIG. 11 is an explanatory view illustrating an object D used in the experiment of the present invention. FIG. 12 illustrates scores for shooting angles of an object D and an object E when the object D illustrated in FIG. 11 was used as a query image. Originally, it is desirable that the range from 132 degrees to 144 degrees with the highest score for the object D is obtained as the recognition result. However, when the scores are high regardless of the dispersion of the number of votes to some extent as in the scores for the object E, an erroneous recognition might be caused.

Next, an experiment for checking a memory amount in the present invention that provides a method of casting a vote for the combination of the object ID and the shooting angle was carried out. It was found from the result of the experiment that the memory amount was 19.98 MB when the number of dimensions of the subspace was 1, and as the number of dimensions increased, the memory amount increased by about 8.26 MB. Table 1 shows a recognition rate and a memory amount (see (1) in database in Table 1) when one-dimensional subspace with the smallest memory amount was used, and a recognition rate and a memory amount (see (2) in database in Table 1) when three-dimensional subspace with the highest recognition rate was used.

In addition, an experiment was carried out by using the database described below according to the nearest neighbor searching method between local features, in order to find how the present invention was useful for the memory reduction and for the maintenance of high recognition rate. The database used for the comparison include: (3) a database having stored therein all local features used to compile the database; (4) a database having stored therein local features obtained by the trace process; and (5) a database having stored therein only local features located on a center of a set of local features as representative vectors of the set after the trace process. Table 1 shows recognition rates and memory amounts obtained by the experiment using these databases.

TABLE 1

| | Database | Recognition rate [%] | Memory [MB] |
|---|---|---|---|
| (1) | One-dimensional subspace | 98.0 | 19.98 |
| (2) | Three-dimensional subspace | 98.9 | 36.48 |
| (3) | All features are stored | 100.0 | 657.22 |
| (4) | Features are selected by trace process | 96.9 | 265.18 |
| (5) | Features on center of trace are only stored | 96.5 | 14.52 |

The memory amount in the case where the three-dimensional subspace was used could be reduced down to about 1/18 of the memory amount of the database (3) that stored all local features. Compared to the database (4) that stored all local features obtained by the trace process, the memory amount could be reduced down to about 1/7, and the recognition rate that was slightly reduced than that of the database storing all local features could be restored. When the memory amount in the case where the one-dimensional subspace was used and the database (5), the memory amount slightly increased than the database (5), but the recognition rate was increased.

The reason why the recognition rate was increased more than the database (5) is as stated below. Specifically, the local features on the center of the trace are only the representative vectors of the plural local features associated by the trace process, and do not represent all local features in the set. On the other hand, the subspace used in the present invention represents even the characteristic of any one of the local features included in the set.

This will be described in more detail. For example, it is supposed that the database includes a set A of local features of an object F with a trace range of 20 degrees to 60 degrees, and a set B of local features with the trace range of 40 degrees to 80 degrees. In this case, the query image is supposed to be formed by shooting the object F from the angle of 40 degrees. In the method of using the local features on the center of the trace, the local feature with 40 degrees is defined as the representative vector in the set A, so that it is associated with the object F. However, in the set B, the local feature with 60 degrees is defined as the representative vector, so that it is difficult to correctly associate with the object F. Therefore, erroneous voting increases, so that an erroneous recognition is liable to occur. On the other hand, in the present invention using the subspace method, the subspace including the orientation of 40 degrees is formed in both sets A and B, whereby the correct recognition can be made. This is because the subspace is originally a method of a classification in order that the characteristic of the member of the class is well represented. Accordingly, it is considered that, in the present invention using the subspace method, erroneous votes are reduced, and the recognition rate is enhanced. In other words, the representative vector is only one local feature, and the local feature represents a "point". On the other hand, the range of the shooting angle represents a "section", and when the "section" is expressed by the "point", a shift inevitably occurs. On the contrary, the obtained subspace represents the "section" in the subspace method. Therefore, a shift does not occur.

Subsequently, an experiment was carried out in which a vote was cast for the combination of the object ID and the shooting angle by using the database (5). Specifically, one local feature was selected from a set of local features after the trace process, information about the range of angles of the trace including this local feature was given to this local feature, and a vote was cast for the range of the shooting angle to which the nearest local feature corresponded during the voting. As a result, the recognition rate was 96.36%, which means the recognition rate almost equal to the recognition rate in the case of casting a vote for each object could be obtained. Strictly speaking, the recognition rate was slightly reduced. From this result, it can be said that it does not make much sense to cast a vote for each shooting angle in the database storing only the local features on the center of the trace. Of course, some objects that were erroneously recognized by the method of casting a vote for each object were correctly recognized by the method of casting a vote for each shooting angle of the object. However, some objects might erroneously be recognized by the method of casting a vote for each shooting angle, on the contrary, and therefore, the recognition rate was not enhanced.

The reason why an object, which is correctly recognized by the method of casting a vote for each object, is erroneously recognized by the method of casting a vote for each shooting angle is considered as follows. Since erroneous votes are large, the votes are dispersed by casting a vote for each shooting angle, even if it is a correct object. Alternatively, some votes are happened to be cast for a shooting angle of an incorrect object. There may be the case in which the score of the shooting angle of a correct object might be reduced by normalizing the number of obtained votes. For example, it is supposed that there are a set of local features of an object G with a range of 20 degrees to 60 degrees, a set of local features with a range of 60 degrees to 100 degrees, and a set of local features with a range of 60 degrees to 110 degrees. There are 3 representative vectors representing 60 degrees of the object G, but actually, the representative vectors represent 40 degrees, 80 degrees, and 85 degrees of the object G. Therefore, when the query image is formed by shooting the object G from 60 degrees, it is difficult to attain the correct association. Accordingly, the denominator $\sqrt{N\omega}$ for the normalization increases more than necessary, so that the score tends to be low.

As described above, according to the present invention, the subspace that can approximately represent the change in the local features, which continuously change, is generated, and the local features are clustered to be represented as one group, and stored in the database, whereby the memory reduction can be realized. As a result, the memory amount can be reduced down to 1/18 of the memory amount for storing all local features, while keeping the recognition rate of 98.9%. Since a vote is cast for each shooting angle of the object, the present invention can not only recognize a type of an object of a query image, but also estimate a rough pose of the object.

<Experiment 2>

Experiments were carried out for the recognition of 1002 objects, wherein each experiment was carried out for confirming (1) usefulness of using ANN, and (2) enhancement of the recognition rate by using the mutual subspace method. In the first experiment, objects were recognized by the comparison between local features and subspaces. In the second experiment, objects were recognized by using the mutual subspace method.

2-1. Preparation of Experiment

The database used in this experiment will be described. In this experiment, each of 1002 three-dimensional objects was put on a turntable, and moving pictures from front, from elevation angle of 15 degrees, and from elevation angle of 30 degrees were taken, as the turntable rotated one revolution.

Figure 14:
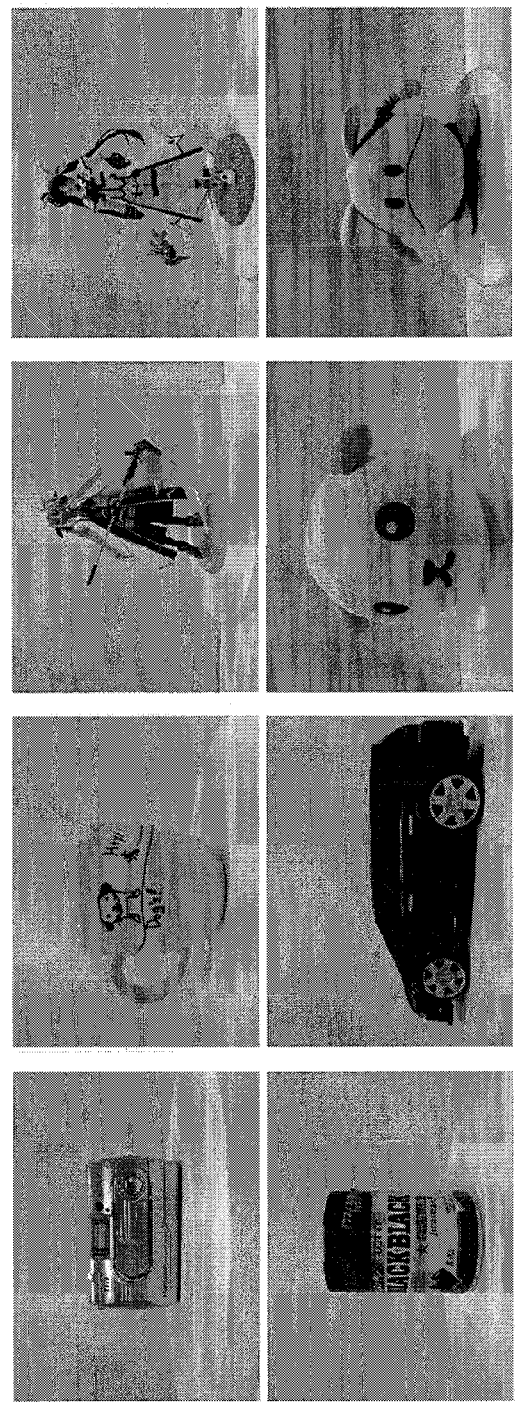
FIG. 14 is an explanatory view illustrating one example of objects stored in a database in an experiment 2 according to the present invention.

FIG. 14 is an explanatory view illustrating one example of objects stored in the database. A frame image was acquired from the shot moving pictures, and the resultant was used as the database image. SIFT features were extracted from these images, and the trace process was executed to form the subspace. The set of local features that were associated for 50 or more consecutive frames by the trace process was used as the set of local features for forming the subspace. The formed subspace was stored in the database together with the object ID. The number of the subspaces was about 550 per one object.

Figure 15:
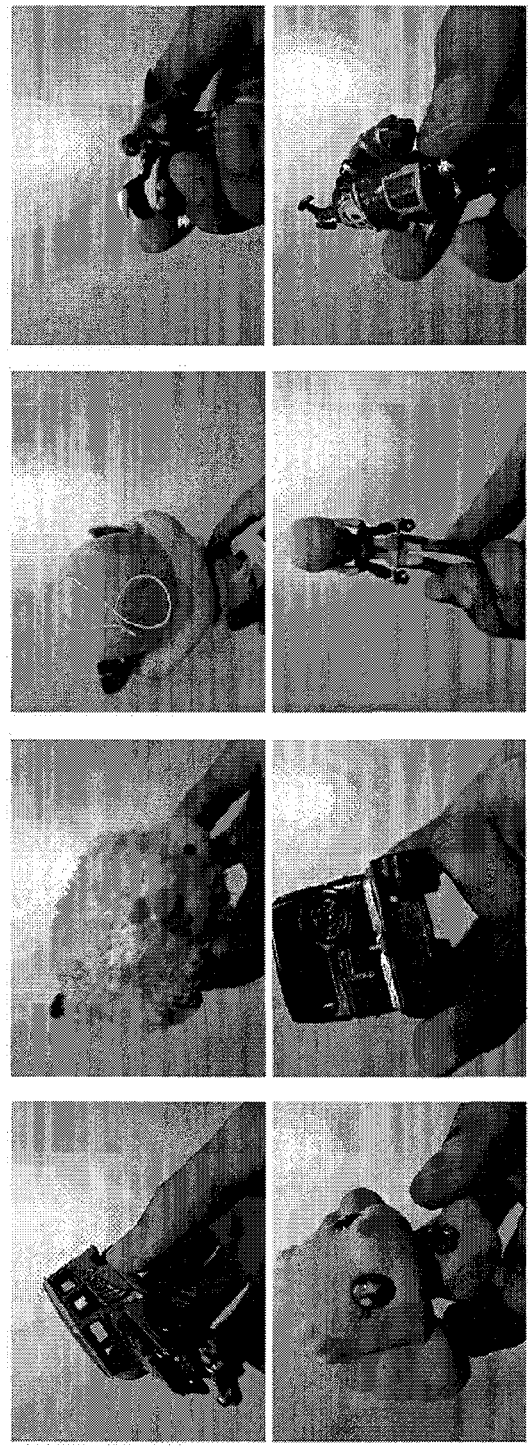
FIG. 15 is an explanatory view illustrating one example of objects shot as a query in the experiment 2 according to the present invention.

Next, the query used in this experiment will be described. 100 objects were randomly selected from 1002 objects used for the database, and the selected objects were held by hand for taking a moving picture of these objects. Frame images were acquired from the obtained moving pictures, and used as query images. FIG. 15 is an explanatory view illustrating one example of the objects captured for the query. SIFT features were also extracted from the query images.

2-2. Experiment Involved with Distance Calculation Using ANN

In order to verify the effectiveness of the distance calculation using ANN as the first experiment, the recognition rate and the processing time were compared between the case of executing the nearest neighbor searching method and the case of executing the approximate nearest neighbor searching method using ANN. The object recognition of the captured objects was performed to each query image.

Table 2 shows the result.

TABLE 2

| $\epsilon$ | 0 | 2 | 3 | 4 | 5 |
|---|---|---|---|---|---|
| Recognition rate (%) | 34.0 | 33.4 | 31.8 | 28.6 | 27.6 |
| Processing time (sec) | 191 | 0.012 | 0.014 | 0.013 | 0.012 |

It is found from the experimental result shown in Table 2 that the recognition using the approximate nearest neighbor search can significantly reduce the processing time without deteriorating the recognition rate so much, compared to the recognition using the nearest neighbor search. It is considered that the reason why the processing time hardly changes even if the parameter $\epsilon$ indicating the degree of similarity in ANN is changed is because the processing time is sufficiently short even if the parameter $\epsilon$ is small, and the variation in the processing time is considered to be caused by an error.

2-3. Experiment Involved with Mutual Subspace Method

The experiment was carried out to confirm the enhancement in the recognition rate by the mutual subspace method. The trace process was performed to the query frame image of each object to form a query subspace. The set of local features that were associated for T or more consecutive frames by the trace process was used as the set of local features for forming the query subspace. The value of T was changed as [8, 13, 25, 38, 50].

A recognition experiment was carried out, as a comparison of the mutual subspace method, by using plural query frame images as one query. The interval of the frame images that were to be clustered was defined as I, and the value of I was changed as [5, 20, 40, 100].

Table 3 shows the result.

TABLE 3

| $\epsilon$ | 2 | 3 | 4 | 5 | 6 |
|---|---|---|---|---|---|
| T = 50 | 64.0 | 64.0 | 60.0 | 58.0 | 58.0 |
| T = 38 | 79.0 | 79.0 | 76.0 | 73.0 | 70.0 |
| T = 25 | 83.0 | 84.0 | 82.0 | 79.0 | 78.0 |
| T = 13 | 94.0 | 94.0 | 92.0 | 91.0 | 88.0 |
| T = 8 | 95.0 | 96.0 | 94.0 | 91.0 | 91.0 |
| I = 100 | 74.0 | 72.0 | 67.0 | 68.0 | 61.0 |

TABLE 3-continued

| $\epsilon$ | 2 | 3 | 4 | 5 | 6 |
|---|---|---|---|---|---|
| I = 40 | 80.0 | 80.0 | 78.0 | 76.0 | 70.0 |
| I = 20 | 86.0 | 85.0 | 86.0 | 84.0 | 77.0 |
| I = 5 | 87.0 | 86.0 | 84.0 | 81.0 | 79.0 |

Compared to the experiment in the item 2-2 in which a single image is used for a query, it is found that higher recognition rate can be attained by the method of using plural frame images in the moving picture as the query, than by the method of using one single image as the query. As the interval of the frame image used as the query becomes shorter (as the number of the images increases), the recognition rate is expected to be higher. In the case of T=8, the number of the subspaces for each object was 5200 on average, and in the case of I=5, the number of local features for each object was 45600 on average. It can be said from this result that the recognition rate and the processing time were enhanced in the recognition by forming the query subspace, compared to the case in which all local features extracted from the plural frame images are used for the recognition.

2-4. Conclusion of Experiment 2

This embodiment describes the technique of increasing the processing time of the method of obtaining the subspace with the highest similarity in the subspace method. According to the present embodiment, the subspace having the highest similarity to the local feature is obtained based upon not only the projection component to each basis of each subspace, but also a magnitude relationship of the distance with a fixed point on a basis of each subspace. Since the subspace is obtained based upon the magnitude relationship of the distance, the approximate nearest neighbor searching method can be executed by using the ANN, whereby the increase in the processing time can be realized.

Consequently, the processing time could be 0.012 second, while keeping the equivalent recognition rate by using the ANN, although the processing time was 190 seconds and the recognition rate was 34% by the conventional subspace method. The proposed method is also applied to the mutual subspace method, whereby the increase in the processing time as well as the significant enhancement in the recognition rate can be realized.

Various modifications are possible for the present invention, in addition to the above-mentioned embodiments. Such modifications should not be deemed to be out of the scope of the present invention. The present invention should include all the modifications within the scope of the claims, their equivalents, and within the above scope.

EXPLANATION OF NUMERALS a, b, c Set of feature vectors
$\alpha1, \alpha2$ Feature vector

The invention claimed is:

1. A method of compiling an image database for a three-dimensional object recognition comprising the steps of:
when a plurality of images each showing a three-dimensional object from different viewpoint are inputted, extracting local features from each of a plurality of images, and expressing the local features using respective feature vectors;
forming sets of the feature vectors, each set representing the local feature of a same part of the object from a series of the viewpoints neighboring one another, and generating subspaces using a subspace method, each subspace representing a characteristic of each set; and storing each subspace to the image database in association with an identifier of the object, wherein the image database is accessed by a computer to perform a recognition process of the three-dimensional object, and the recognition process is realized by the steps of: when one image of an object from a certain viewpoint or a plurality of images of the object from a series of viewpoints are given as a query, extracting a plurality of feature vectors as query feature vectors representing local features of the query; determining the subspace most similar to each query feature vector; and executing a counting process to the identifiers, each identifier being associated with each subspace, to retrieve a three-dimensional object most similar to the query.

2. The method according to claim 1, wherein
the storing step stores a combination of the identifier of the object and viewpoint data representing the series of the viewpoints in association with each subspace, and
the recognition process executes a counting process to the combinations associated with the respective subspaces, in order to retrieve the most similar object and a most similar viewpoint to the query.

3. The method according to claim 1, wherein
the subspace generating step calculates the distance between respective pair of feature vectors corresponding to the neighboring viewpoints in each set, excludes the pair as a noise when the distance differs more than a prescribed criteria from distances acquired from the different pairs, and regards the rest of the feature vectors as the set of feature vectors representing the same part of the three-dimensional object.

4. The method according to claim 1, wherein
the subspace generating step generates the subspaces when the feature vectors in each set cover an equal or more amount of a predetermined viewpoint-change, and avoids generating the subspaces when the feature vectors in each set cover less amount of the predetermined viewpoint-change.

5. The method according to claim 4, wherein
the subspace generating step excludes the pair as a noise when the difference between the distance regarding the nearest pair and the distance regarding the second nearest pair exceeds the prescribed criteria.

6. The method according to claim 1, wherein
the recognition process projects each query feature vector to a basis determining a coordinate system of each of the subspaces previously stored in the image database to calculate the similarity between each query feature vector and each subspace based upon a size of a projection component, and determines the subspace with the highest similarity as the subspace that is most similar to the query feature vector.

7. The method according to claim 1, wherein
the recognition process determines a basis of a first principal component involved with a maximum eigenvalue for each subspace in a set of feature vectors whose characteristic is represented by each subspace, plots points on positions, distant from an origin with a normalized equal distance, on each basis of the first principal component, obtains the distance between each point and each query feature vector by applying an approximate nearest neighbor searching method, and determines the subspace with the shortest distance as the subspace that is most similar to the query feature vector.

8. The method according to claim 7, wherein
the recognition process selects some candidates for the subspace similar to each query feature vector by the method according to claim 7, and after that, projects the query feature vector to each basis of each subspace that is determined as the candidate to calculate the similarity between each query feature vector and each subspace based upon the size of the projection component, and determines the subspace with the highest similarity as the subspace most similar to the query feature vector.

9. The method according to claim 1, wherein
instead of the process of determining the subspace most similar to each query feature vector, the recognition process is realized by the steps of: (1) when a plurality of images of an object from a series of viewpoints are given as a query, generating a plurality of sets each including query feature vector involved with the query, each set representing local features of the same part of the object viewed from viewpoints neighboring each other, and generating a plurality of query subspaces each representing the characteristic of each set by a subspace method, (2) plotting query reference points on positions, distant from an origin with a predetermined normalized distance, on each basis determining a coordinate system of each query subspace, and plotting reference points on positions, distant from an origin with a predetermined normalized distance, on each basis of each subspace stored in the database, and (3) determining the subspace having the reference point distant from each query reference point with the shortest distance by applying an approximate nearest neighbor searching method, in order to determine the subspace most similar to each query subspace.

10. The method according to claim 1, wherein
the viewpoint data is data indicating a shooting angle of the object.

11. The method according to claim 1, wherein
the subspace generating step generates the subspaces by forming the set from the feature vectors using a CLAFIC method.

12. The method according to claim 1, wherein
a number of dimensions of the subspace is 1 or more and 3 or less.

13. An apparatus of compiling an image database for a three-dimensional object recognition comprising:
an extracting section that, when a plurality of images each showing a three-dimensional object from different viewpoint are inputted, extracts local features from each of a plurality of images, and expresses the local features using respective feature vectors;
a subspace generating section that forms sets of the feature vectors, each set representing the local feature of a same part of the object from a series of the viewpoints neighboring one another, and generates subspaces using a subspace method, each subspace representing a characteristic of each set; and
a storing section that stores each subspace to the image database in association with an identifier of the object, wherein
the image database is accessed by a recognition apparatus of the three-dimensional object, and the recognition apparatus has functions of: when one image of an object from a certain viewpoint or a plurality of images of the object from a series of viewpoints are given as a query, extracting a plurality of feature vectors as query feature vectors representing local features of the query; determining the subspace most similar to each query feature vector; and executing a counting process to the identifiers, each identifier being associated with each subspace, to retrieve a three-dimensional object most similar to the query.

* * * * *